(12) United States Patent
Ting et al.

(10) Patent No.: US 7,145,866 B1
(45) Date of Patent: Dec. 5, 2006

(54) VIRTUAL NETWORK DEVICES

(75) Inventors: Dennis P. J. Ting, Groton, MA (US); William C. Conway, Southborough, MA (US)

(73) Assignee: EMC Corporation, Hopkinton, MA (US)

( * ) Notice: Subject to any disclaimer, the term of this patent is extended or adjusted under 35 U.S.C. 154(b) by 853 days.

(21) Appl. No.: 09/872,596

(22) Filed: Jun. 1, 2001

Related U.S. Application Data

(60) Provisional application No. 60/272,716, filed on Mar. 1, 2001.

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. .................. 370/225; 370/216; 370/217; 370/227; 370/228

(58) Field of Classification Search .......... 370/216, 370/217, 221, 225, 227, 228
See application file for complete search history.

(56) References Cited

U.S. PATENT DOCUMENTS

| | | | | |
|---|---|---|---|---|
| 5,959,968 A | * | 9/1999 | Chin et al. ............... | 370/216 |
| 6,049,528 A | | 4/2000 | Hendel et al. ............ | 370/235 |
| 6,385,197 B1 | * | 5/2002 | Sugihara .................. | 370/380 |
| 6,678,241 B1 | * | 1/2004 | Gai et al. ................. | 370/216 |
| 2002/0071386 A1 | * | 6/2002 | Gronke ..................... | 370/217 |
| 2002/0138628 A1 | * | 9/2002 | Tingley et al. ........... | 709/227 |

OTHER PUBLICATIONS

Frazier, H., "Link Aggregation and Trunking", *IEEE 802 LMSC Tutorial*, http://graper.ieee.org/groups/802/3/trunk-study/tutorial.index.html, Sun Microsystems, (Nov. 1997).

* cited by examiner

*Primary Examiner*—Wellinston Chin
*Assistant Examiner*—Blanche Wong
(74) *Attorney, Agent, or Firm*—Hamilton, Brook, Smith & Reynolds, P.C.

(57) ABSTRACT

A trunk in a network file server includes at least two communications ports. The trunk is created by combining the communications ports into a single virtual device and assigning ownership of the communications ports to the virtual device. A failsafe network device including at least two trunks, with each trunk coupled to different switches can be created by creating a third virtual device. Ownership of a first virtual device including communication ports coupled to a first switch and a second virtual device including communication ports coupled to a second switch is assigned to the third virtual device.

28 Claims, 6 Drawing Sheets

VIRTUAL NETWORK DEVICES

RELATED APPLICATIONS

This application claims the benefit of U.S. Provisional Application No. 60/272,716, filed on Mar. 1, 2001, the entire teachings of which are incorporated herein by reference.

BACKGROUND OF THE INVENTION

A data processor such as a file server can include at least one Network Interface card ("NIC") to provide access to a communications network. The NIC includes at least one network device port for communicating over a particular type of communications network. The specific type and format of data transmitted over the network depends upon the communication network protocols used such as, the Ethernet or Institute of Electrical and Electronics Engineers (IEEE) 802.3 protocol, higher layer Transmission Control Protocol/Internet Protocol (TCP/IP), or the Asynchronous Transfer Method ("ATM") protocol.

In a communications network that transmits data using the Ethernet protocol, ports coupled to the communications network are identified by a Media Access Control ("MAC") address. Data is transmitted over the communications network in the payload of a data packet. Each data packet includes a MAC source address associated with the transmitting port and a MAC destination address associated with the port to which the data packet is to be delivered.

The file server receives requests for files made accessible by the file server from clients connected to the communication network. Each such request is transmitted in the payload of a data packet. The data packet includes a MAC destination address assigned to one or more network device ports in the file server. Although the client can transmit data to the file server to any of the MAC addresses assigned to network device ports in the file server, this can result in uneven distribution of data packets, resulting in reduced bandwidth to the file server.

Bandwidth to a file server can be increased by aggregating physical links from the file server to a switch connected to the communications network. One scheme for link aggregation or trunking for an Ethernet network is described in the IEEE 802.3ad standard. To implement link aggregation, a plurality of ports in the switch are assigned to a trunk by assigning the same MAC address to each port. A data packet for the MAC destination address assigned to the trunk can be forwarded through any port that is a member of the trunk.

A virtual device driver in the file server can then process data packets received by any of the network device ports that are members of the trunk. The file server also selects one of the network device ports that are members of the trunk through which to transmit a data packet to the switch.

Upon detecting a failure in one of the network device ports or physical links in the trunk, the virtual device driver can also transmit the data packet through another network device port that is a member of the same trunk. However, upon failure of the trunk there is no alternate path to the MAC address.

SUMMARY OF THE INVENTION

A method and apparatus is provided for aggregating bandwidth over a communications network and providing redundancy in case of failure of a link in a switch, the switch coupled between a network file server and the communications network. The network file server includes a plurality of communications ports coupled to a switch. A trunk configuration routine in the network file server creates a virtual device for the plurality of communications ports and sets a trunk network address to a first network address assigned to a first communications port. The trunk configuration routine sets network addresses for the plurality of communications ports and a virtual network address assigned to the virtual network device to the trunk network address. The network file server also includes an owner routine. The owner routine selects a virtual device associated with the trunk network device for a data packet for the trunk network address received by any of the communications ports in the trunk.

The network file server also includes a device driver. The device driver allocates a device structure for each of the plurality of communications ports. Each device structure including an owner field. The trunk configuration routine allocates a device structure for the virtual device and stores a pointer to the device structure allocated for the virtual network device in the owner field in each of the device structures allocated for the plurality of communications ports. The owner routine examines the contents of the owner field in the device structure allocated to the communications port receiving the data packet and selects the virtual device pointed to by the pointer stored in the owner field.

The network file server also includes a virtual device driver which selects one of the plurality of communications ports through which to transmit a data packet on the trunk. The virtual device driver may select the one of the plurality of communications ports dependent on the result of an exclusive OR operation on a portion of a source network address and a destination network address. The portion of the source network address and the destination network address are dependent on a number of communications ports in the trunk. The trunk network may be a data link layer address. The data link layer address may be an Ethernet address.

A second plurality of communications ports may be coupled to a second switch. In that case, the configuration routine assigns ownership of the second plurality of communications ports coupled to a second switch to a second virtual network device and ownership of the virtual network device and the second virtual network device to a third virtual network device. The configuration routine also sets a failsafe network device address to the trunk network address and sets network addresses assigned to the plurality of communications ports to the third network address and a virtual network address assigned to the virtual network address to the failsafe network device address. The owner routine selects the third virtual network device associated with the failsafe network device for a data packet for the failsafe network device address received by any of the communications ports in the failsafe network device.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
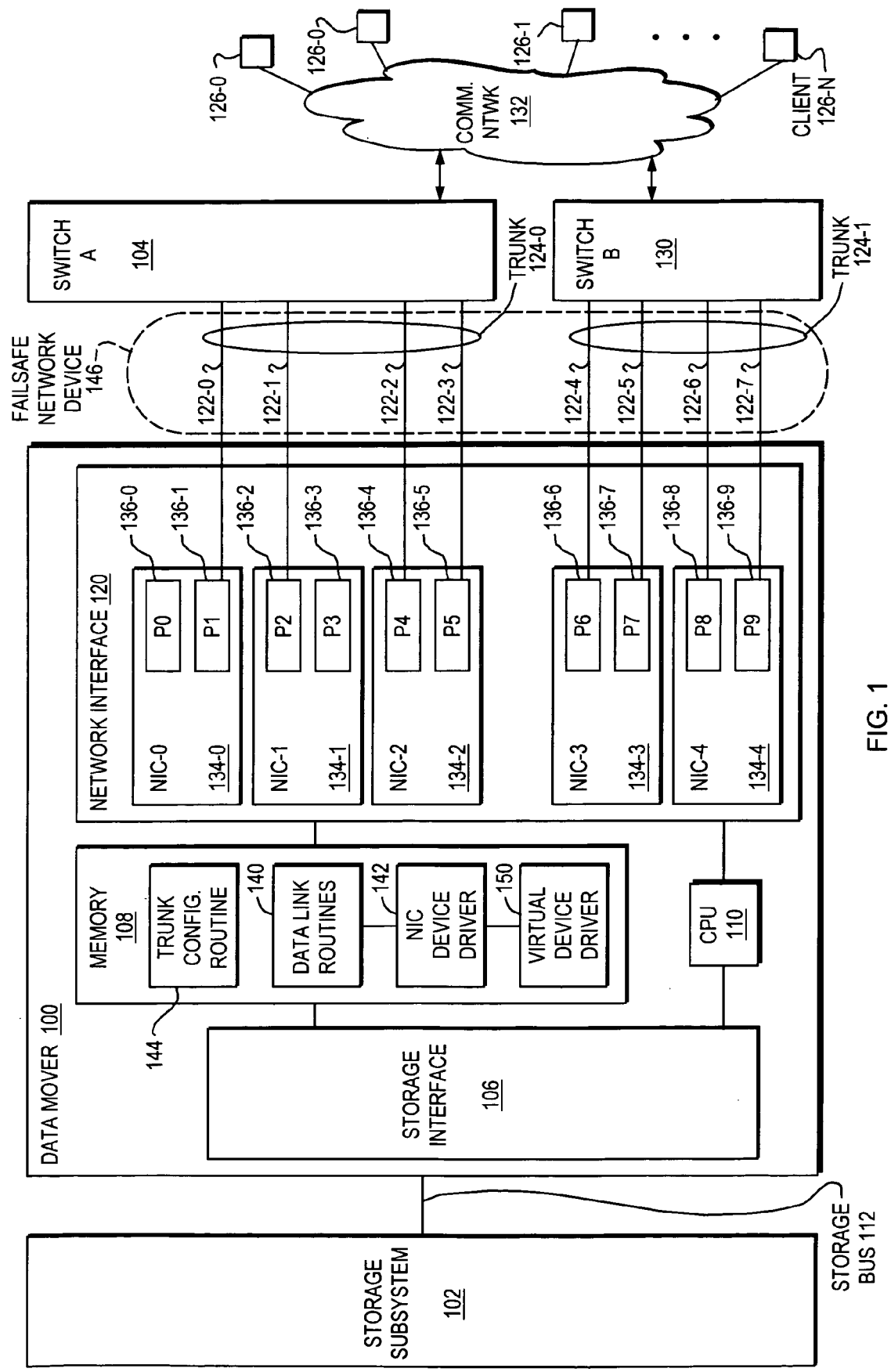
FIG. 1 is a block diagram illustrating a data mover for moving data between a plurality of clients and a storage subsystem over a physical links coupled between switches and the data mover according to the principles of the present invention.

FIG. 1 is a block diagram illustrating a data mover 100 for moving data between a plurality of clients 126-0, 126-1, 126-2, . . . ,126-N and a storage subsystem 102 over physical links 122-0, . . . ,122-7 coupled between switches 104,130 and the data mover 100 according to the principles of the present invention.

The data mover 100 includes a Cental Processing Unit ("CPU") 110, memory 108, a storage interface 106 and a network interface 120. The data mover 100 acts as a file server for clients 126-0, 126-1, 126-2, . . . ,126-N coupled to a communications network 132. The network interface 120 provides access to the communications network 132 through switches 104, 130. The data mover 100 also provides access to data stored in the storage subsystem 102 through the storage interface 106 in the storage subsystem 102 and stores data received from any of the clients 126-1, 126-2, 126-3, . . . , 26-N in the storage subsystem 102.

The storage interface 106 is coupled to the storage subsystem 102 through a storage bus 112. The storage bus 112 can be a parallel Small Systems Computer Interface ("SCSI") bus defined by the American National Standards Institute ("ANSI") SCSI standard or a serial Fibre Channel ("FC") bus also defined by the ANSI SCSI standard, or any other type of storage peripheral bus. The ANSI SCSI standard is well-known and beyond the scope of the present invention. The storage subsystem 102 can include non-volatile storage such as disks in a cached disk array or tapes in a tape silo.

An embodiment of the invention is described for a communications network 132 that transmits data using the Ethernet protocol. However, the invention is not limited to a communications network 132 using the Ethernet protocol. It should be understood that the invention can be used with any communications network that supports link aggregation by allowing the configuration of a trunk including a plurality of physical links coupled to a switch.

The Ethernet protocol performs functions of various layers in the Open Systems Interconnection ("OSI") reference model. Data is stored in the payload of a frame or data packet. The data packet includes a data link layer header which stores a data link layer destination address to which the frame is to be delivered and a data link layer source address associated with the transmitter of the data packet. The data link layer source address and destination address included in an Ethernet data packet are commonly referred to as the Media Access Control ("MAC") source and destination addresses.

The network interface 120 includes at least one Network Interface Card ("NIC")>134-0, . . . ,134-4. Each NIC 134-0, . . . ,134-4 includes at least one network device port 136-0, . . . ,136-9. Each network device port 136-0, . . . ,136-9 can be assigned a unique MAC address and can independently transmit and receive data over the communications network 132 through the switch 104, 130.

Each NIC 134-0, . . . ,134-4 is shown with two network device ports 136-0, . . . , 136-9. However, any of the NICs 134-0, . . . ,134-4 can include more or less network device ports. For example, a NIC can include eight Fast Ethernet (FE) device ports or one Gigabit Ethernet (GE) device port.

The network interface 120 is coupled to switches 104, 130 through physical links 122-0, . . . ,122-7. The network interface 120 transmits and receives data packets over the physical links 122-0, . . . ,122-7 using a network communications protocol. Link aggregation is provided by configuring physical links 122-0, . . . ,122-3 coupled to switch 104 as members of trunk 124-0 and configuring physical links 122-4, . . . ,122-7 as members of trunk 124-1. A destination address assigned to trunk 124-0 is also assigned to all physical links 122-0, . . . ,122-3 which are members of trunk 124-0. Bandwidth to the MAC destination address associated with trunk 124-0 is increased by providing multiple physical links 122-0, . . . ,122-3 to the MAC destination address. The plurality of physical links 122-0, . . . ,122-3 provide redundancy in the case of a failure of any of the physical links or network device ports by providing alternate paths to the MAC destination address.

The Ethernet protocol supports a plurality of data transfer rates over the network. The data transfer rate for Fast Ethernet is 100 Mega-bits per second ("Mbps") and the data rate for Gigabit Ethernet is one Gigabit per second ("Gbps"). A plurality of NICS 134-0, . . . ,134-4 with different data transfer rates can be included in the data mover 100. For example, the network interface 120 can include Fast Ethernet or Gigabit Ethernet network device ports. However, for link aggregation of physical links using the Ethernet protocol, all of the physical links 122-0, . . . ,122-3 in the trunk 124-0 in the switch 104, 130 must support the same data transfer rate.

The network switch 104, 130 coupled to the data mover 100 also implements the Ethernet protocol and supports link aggregation. Ethernet protocol switches that support link aggregation include ALTEON's ACEswitch 180, NORTEL's BAYSTACK 350 switch, CABLETRON's SMARTSWITCH 2200 switch, CISCO's 6500, 5505 and 29489 switches and FOUNDING BIG IRON's Ethernet switch.

In the embodiment shown, trunk 124-0 includes four physical links 122-0, . . . , 122-3, and trunk 124-1 includes four physical links 122-4, . . . ,122-7. However, the invention is not limited to four physical links per trunk. Each of the physical links 122-0, . . . ,123-3 in trunk 124-0 and physical links 122-4, . . . ,122-7 in trunk 124-1 are coupled to an independent physical network device port 136-0, . . . ,136-9 in the network interface 120. Each network device port 136-1, . . . ,136-9 can be assigned a different Media Access Control ("MAC") address and Internet Protocol ("IP") address.

Each trunk 124-0, 124-1 is configured in both the respective network switch 104, 130 and the data mover 100. In each switch 104, 130 the same trunk mode is configured for all ports in the respective trunk. The trunk mode includes the selection of auto-negotiate, duplex and speed settings for all ports in the trunk 124-0, 124-1. Configuration of a trunk 124-0, 124-1 in a switch 104 to provide link aggregation is well-known in the art and beyond the scope of the present invention. Configuration of a trunk 124-0, 124-1 is performed by the trunk configuration routine 144 in the data mover 100 and is described later in conjunction with FIG. 3.

Upon receiving a data packet from a client 126-1, . . . ,126-N to be transmitted over trunk 124-0, switch 104 selects one of the physical links 122-0, . . . ,122-3 coupled to ports in the switch 104 over which to transmit the data packet. Methods implemented in the switch 104 for selecting one of the physical links 122-0, . . . ,122-3 in the trunk 104 are well known in the art and beyond the scope of the present invention. The method for processing a data packet received on one of the physical links 122-0, . . . , 122-3 in trunk 124-0 implemented in memory 108 (FIG. 1) is described later in conjunction with FIG. 6.

Before transmitting a data packet over trunk 124-0, a virtual device driver 150 selects one of the physical links 122-0, . . . ,122-3 coupled to network device ports 136-0, . . . ,136-5. The data packet is forwarded to the respective NICdevice driver 142 (FIG. 1) dependent on the selected physical link. The NICdevice driver 142 handles requests to transmit data packets through network device ports in the NIC 134-0, . . . ,134-4 and processes data packets received from the network device ports 136-0, . . . ,136-9 (FIG. 1). Typically, a NICdevice driver manages data packet transfer through all NICs of the same vendor type.

Upon receiving a request to forward the data packet, the NIC device driver 142 (FIG. 1) requests that the NIC transmit the data packet over the selected physical link 122-0, . . . ,122-4. In one embodiment, the physical link 122-0, . . . ,122-3 is selected by performing an eXclusive OR ("XOR") operation on a number of bits of the source and destination MAC addresses. The result of the XOR operation selects one of the physical links 122-0, . . . ,122-3. The number of bits of the source and destination MAC addresses, selected for performing the XOR operation is dependent on the number of physical links 122-0, . . . ,122-3 in the trunk 124-0. For example, for the four physical links 122-0, . . . ,122-3 in trunk 124-0, the XOR operation is performed on two bits of the source and destination MAC addresses. If the selected physical link 122-0, . . . , 122-3 is not available, one of the other physical links 122-0, . . . ,122-3 is selected. For example, the other physical link can be the next sequential physical link 122-0, . . . , 122-3 or the first physical link 122-0, . . . ,122-3 in the trunk 124-0.

For trunk 124-0 with four physical links 122-0, . . . ,122-3, the two Least Significant Bits ("LSBs") of the source address and the destination address are XORed to select a physical link 122-0, . . . ,122-3. The physical link 122-0, . . . ,122-3 in the trunk 124-0 that is selected, is dependent on the two LSBs of the source and destination MAC addresses as shown in the table below:

TABLE 1

| MAC Source Address | MAC Destination Address | MAC Physical link # |
|---|---|---|
| 00 | 00 | 00 (0) |
| 01 | 10 | 11 (3) |
| 11 | 10 | 01 (1) |

Each trunk 124-0, 124-1 can include physical links that are coupled to network device ports 136-0, . . . ,136-9 in different NICs 134-0, 134-4. As shown, trunk 124-0 includes physical links 122-0, . . . ,122-4. Physical link 122-0 is coupled to network device port 136-1 in NIC 134-0. Physical link 122-1 is coupled to network device port 136-2 in NIC 134-1. Physical link 122-2 is coupled to network device port 136-4 in NIC 134-2 and physical link 122-3 is coupled to network device port 136-5 in NIC 134-2.

A failsafe network device 146 that includes trunks 124-0 and 124-1 can be configured. Trunk 124-0 includes physical links 122-0, . . . ,122-3 coupling the network interface 120 to switch 104. Trunk 124-1 includes physical links 122-4, . . . ,122-7 coupling the network interface 120 to switch 130. Failsafe network device 146 provides redundancy in the case of failure of one of the trunks 124-0, 124-1 by providing a path to the MAC destination address assigned to failsafe network device 142 through the other trunk 124-0, 124-1. The same MAC address is assigned to trunks 124-0, 124-1 and failsafe network device 146. Thus, a data packet received by switch 104 from clients 126-1, . . . ,126-N is forwarded to the network interface 120 on trunk 124-0. A data packet received by switch 130 for the MAC address assigned to failsafe network device 146 is forwarded by switch 130 on trunk 124-1. Upon a failure of trunk 124-0, clients 126-1, . . . ,26-N can access the MAC address assigned to failsafe network device 146 through trunk 124-1. Thus, multiple levels of redundancy can be provided by creating virtual devices for trunks and failsafe network devices.

Figure 2:
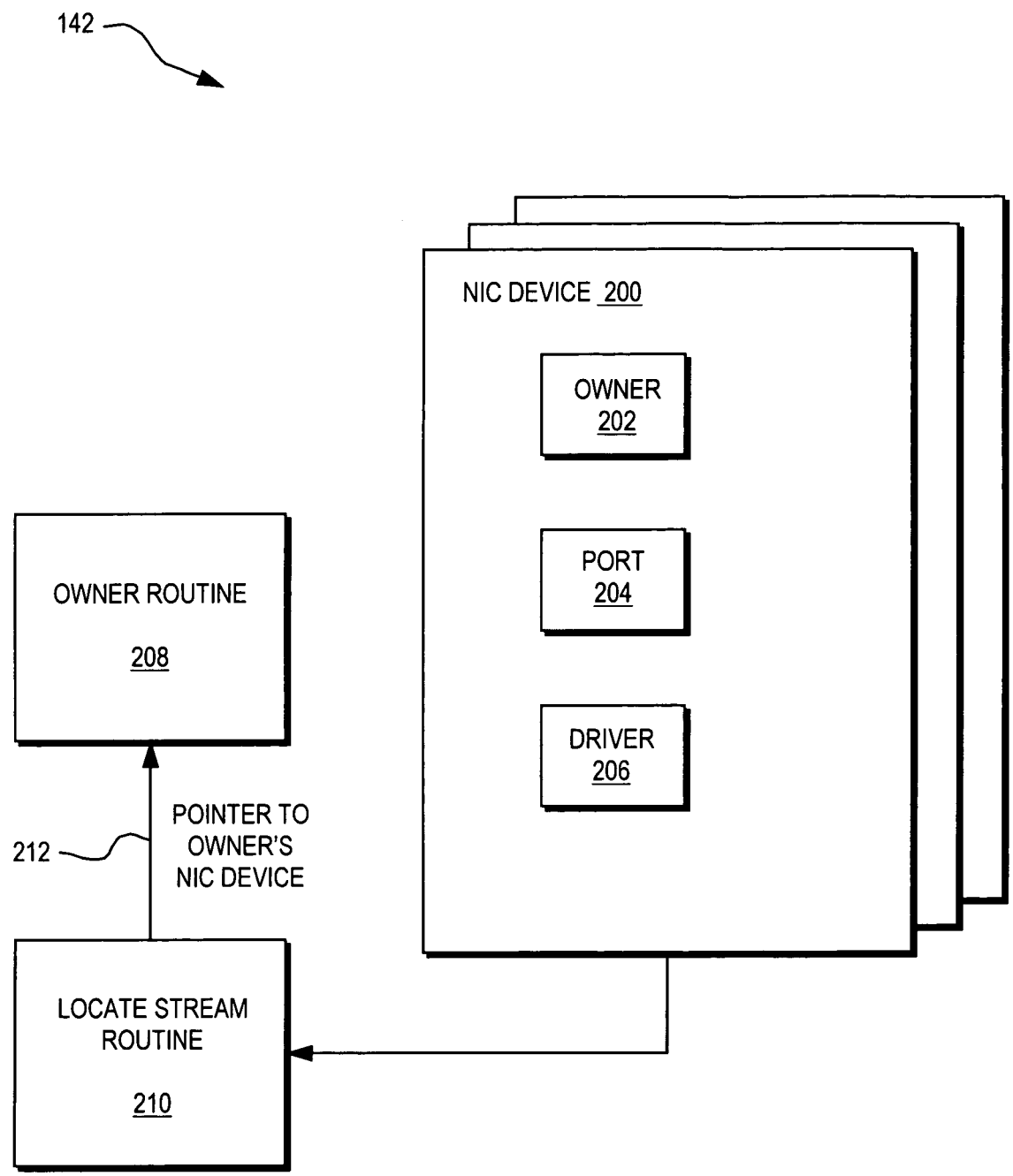
FIG. 2 is a block diagram of device structures allocated in memory for each network device port shown in FIG. 1.

FIG. 2 is a block diagram of device structures allocated in the NICdevice driver 142 in memory 108 for each network device port shown in FIG. 1. A NICdevice structure 200 is allocated for each network device port 136-0, . . . ,136-9 in the network interface 120 in the data mover 100. A NICdevice structure 200 is also allocated for each trunk 124-0, 124-1 and failsafe network device 146. The NICdevice structure 200 includes an owner field 202, a port field 204 and a driver field 206. The port field 204 stores a unique number assigned to the network device port 136-0, . . . ,136-9. The driver field 206 stores a pointer to the NICdevice driver 142 associated with the network device port 136-0, . . . ,136-9. The NICdevice driver 142 manages NICs 134-0, . . . , 134-4 of the same vendor type installed in the data mover 100.

The data link routines 140 and virtual device driver 150 process a request to transmit data to a MAC destination address and forward the request including the source MAC address and the destination MAC address to the respective NICdevice driver 142. The data link routines 140 and virtual device driver 150 also process data included in data packets received from the NICdevice driver 142 dependent on the MAC destination address included in the received data packet.

The owner field 202 in the NICdevice structure 200 allows the data link driver 140 to configure a network device port 136-0, . . . ,136-9 as a member of a trunk 124-0, 124-1. If the network device port 136-0, . . . ,136-9 is not assigned to a trunk 124-0, 124-1 the owner field 202 in the NICdevice structure 200 allocated for the network device port 136-0, . . . ,136-9 stores '0'. If the network device port 136-0, . . . ,136-9 is a member of a trunk 124-0, 124-1 the owner field 202 in the NICdevice structure 200 allocated for the network device port 136-0, . . . ,136-9 stores a pointer to the NICdevice structure 200 allocated for the trunk 124-0, 124-1.

Upon receiving a data packet, a locatestream routine 210 is called by the NICdevice driver with a pointer to the NICdevice structure 212 allocated to the network device port through which the data packet was received and the protocol type of the message. The protocol type can be Internet Protocol ("IP") or Address Resolution Protocol ("ARP"). The owner routine 208 examines the state of the owner 202 in the NICdevice structure 200 to determine if the network device port is a member of trunk. If the owner 202 stores a pointer to another NICdevice structure 200, the locatestream routine is called again with the pointer to the other NICdevice structure 200 and the owner routine 208 examines the state of the owner in the other NICdevice structure.

The owner routine 208 continues to examine the state of the owner bit in successive NICdevice structures until the owner bit in the referenced NICdevice structure is '0' indicating that the NICdevice structure does not have an owner.

Once the NICdevice structure with owner='0' is found, the locatestream routine 210 calls one of the routines in the data link routines 140 (FIG. 1) to process the received data packet for the destination MAC address. A routine in the data link routines 140 searches a list of protocol stream modules registered with the port for the protocol stream module matching the protocol type (ARP or IP). The up stream queue associated with the protocol module is returned. Later, another routine in the data link routines 140 packages the message in the data packet and sends the message up stream to the selected protocol module.

Figure 3:
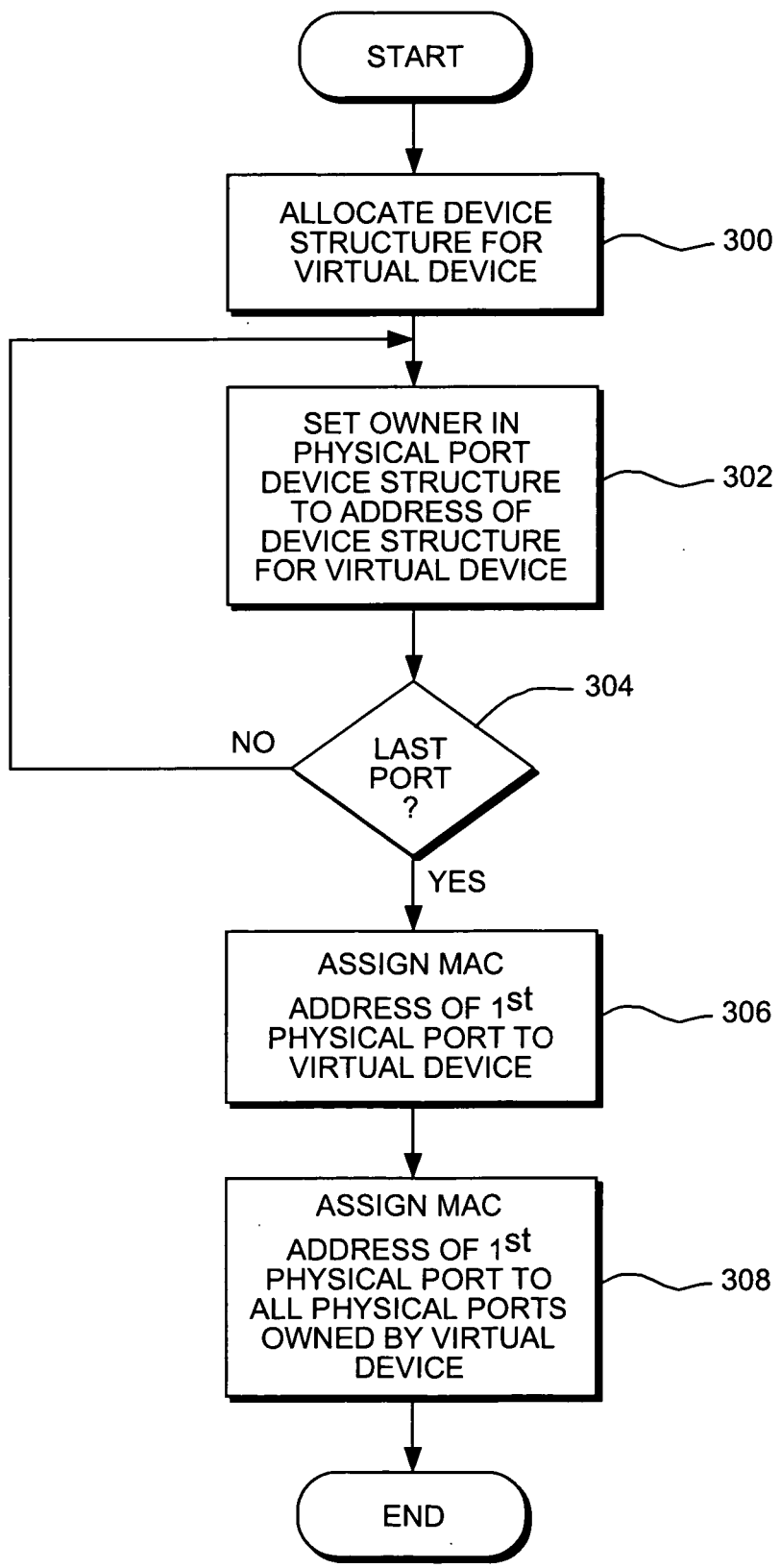
FIG. 3 is a flowchart illustrating a method for configuring a trunk between the data mover and any of the switches shown in FIG. 1.

FIG. 3 is a flowchart illustrating a method for configuring a trunk 124-0, 124-1 including physical links 122-0, . . . ,122-7 coupled between the data mover 100 and any of the network switches 104,130 shown in FIG. 1.

The trunk configuration routine 144 in memory 108 in the data mover 100 is called to create a trunk 124-0, 124-1 upon receiving a user command to create a trunk 124-0, 124-1. The configuration routine 144 is called to create a trunk 124-0, 124-1 by entering the following command:

server_sysconfig movername -virtual -n device -create class -options option_list where:
- movername=data mover node name.
- device=user-defined device name of trunk (for example, trk0).
- class=class of the interface being created. (trunk).
- option_list=list of physical NICdevice ports 136-0 . . . 136-9 being
- aggregated in the trunk 124-0, 124-1.

The trunk configuration routine 144 is called to create trunk 124-0, 124-1 to include physical links 122-0, . . . ,122-7 coupled to both switch 104 and switch 130 by entering the following command:

server_sysconfig movername -virtual -n device -create class -options option_list where
- device=user-defined device name of trunk (trk3).
- class=class of the interface being created. (trunk).
- option list=list of trunks being aggregated in this trunk. (For example, trk0 for
- trunk 124-0 and trk1 for trunk 124-1)

The server_sysconfig command is parsed using a command line interface utility program. Command link interface utility programs are well-known to those skilled in the art and beyond the scope of the present invention. After parsing the command, the utility program calls the trunk configuration routine 144 to create the trunk 124-0, 124-1.

The members of the trunk 124-0, 124-1 can include network device ports 136-0, . . . ,136-9 on different NICs 134-0, . . . ,134-4. A method implemented by the trunk configuration routine 144 for configuring of a trunk 124-0, 124-1 is now described in conjunction with FIGS. 1 and 3).

At step 300, the trunk configuration routine 144 executing in memory 108 in the data mover 100 creates a virtual device for the trunk 124-0, 124-1 by allocating a NICdevice structure 200. The NICdevice structure 200 is created for a "virtual" device because there is no physical network device port 136-0, . . . ,136-9 associated with the trunk 124-0, 124-1. A virtual device driver 150 in the memory 108 includes a virtual device receive routine for processing data received for a virtual device. The data link layer routines 140 perform data link layer processing for all data packets received by any of the network device ports 136-0, . . . ,136-9 in the trunk 124-0, 124-1, using the NICdevice structure 200 allocated for the respective trunk 124-0, 124-1. The trunk configuration routine 144 initializes NICdevice structure 200 allocated for the trunk 124-0, 124-1 by setting the owner element 202 to '0' to indicate that the trunk 124-0, 124-1 is not a member of another trunk 124-0, 124-1.

At step 302, the trunk configuration routine 144 sets the owner 202 in each of the respective NICdevice structures 200 for each network device port 136-0, . . . ,136-9 to be included in the trunk 124-0, 124-1 to the address of the NICdevice structure 200 allocated for the respective trunk 124-0, 124-1.

At step 304, the trunk configuration routine 144 checks if owner 202 has been set to the address of the owner's NICdevice structure in the NICdevice structure 200 for each of the network device ports 136-0, . . . ,136-9 in the trunk 124-0, 124-1. If so, processing continues with step 306. If not, processing continues with step 302 to set owner 202 to the address of the owner's NICdevice structure in the next NICdevice structure 200. Processing continues with step 306.

At step 306, each network device port 136-0, . . . ,136-9 has a software configurable MAC address through an interface routine in the NICdevice driver 142 associated with the network device port 136-0, . . . ,136-9. The trunk configuration routine 144 reads the MAC address assigned to the first network device port 136-0, . . . , 136-9 in the trunk 124-0, 124-1. The MAC address assigned to the first network device port is assigned to the trunk 124-0, 124-1. Processing continues with step 308.

At step 308, the configuration utility assigns the MAC address assigned to the trunk 124-0, 124-1 to the other network device ports 136-0, . . . ,136-9 in the trunk 124-0, 124-1. Processing is then complete.

Thus, a trunk 124-0, 124-1 is created by allocating a NICdevice structure 200 for the trunk 124-0, 124-1 modifying owner 202 in NICdevice structures already allocated for each network device port 136-0, . . . ,136-9 to be members of the trunk 124-0, 124-1 by storing a pointer to the allocated NICdevice structure 200 for the trunk 124-0, 124-1. Data link processing for data packets received by any of the network device ports 136-0, . . . ,136-9 are processed by the virtual device driver 150 for the trunk 124-0, 124-1 using the allocated NICdevice structure 200 for the trunk 124-0, 124-1. The fact that a network device port 136-0, . . . ,136-9 is a member of a trunk 124-0, 124-1 is transparent to each network device port 136-0, . . . ,136-9 in the trunk 124-0, 124-1.

Figure 4:
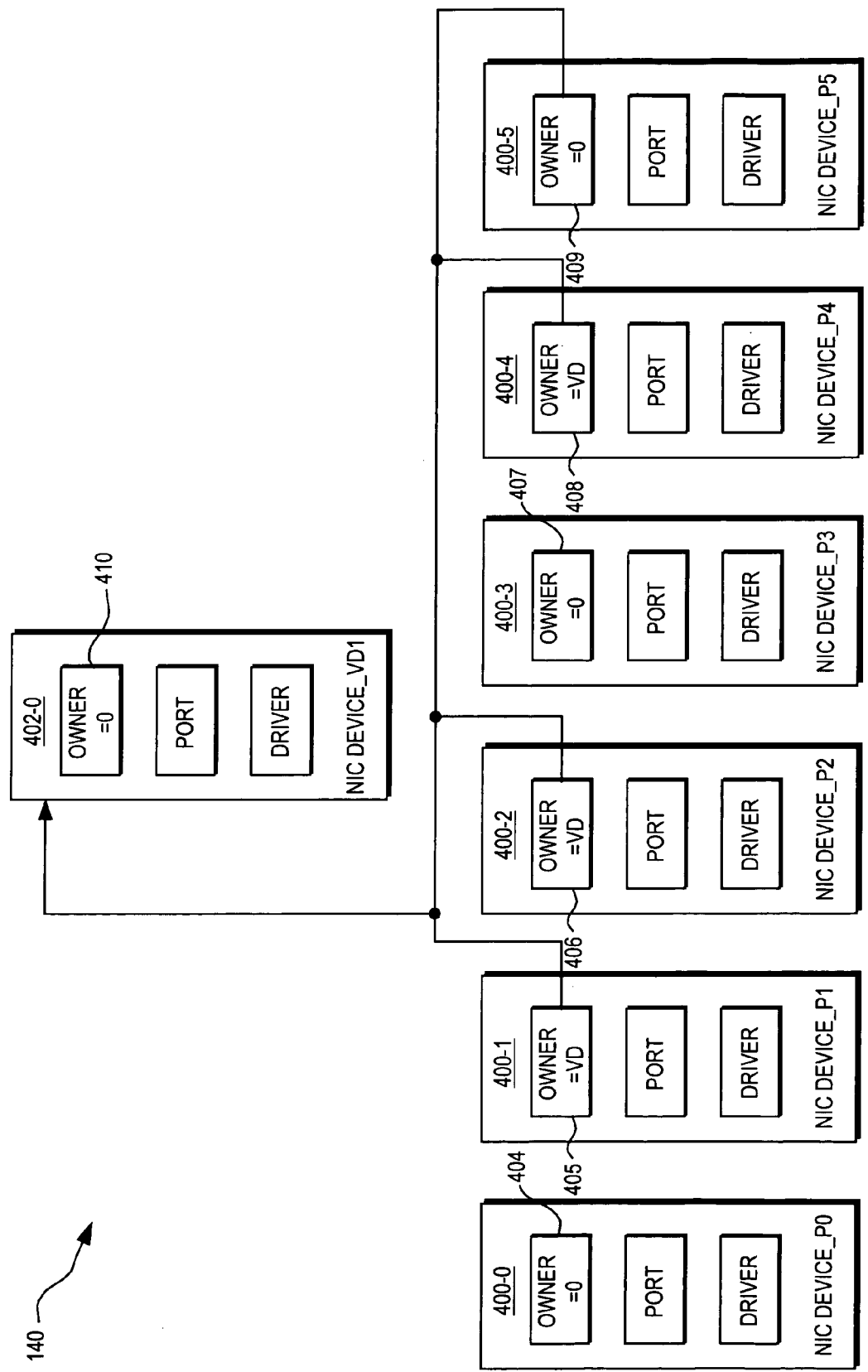
FIG. 4 is a block diagram illustrating the device structures allocated in memory in the data mover after configuring one of the trunks shown in FIG. 1.

After the NICdevice structure 200 has been created for the trunk 124-0, 124-1 an IP address is assigned to the trunk 124-0, 124-1. The IP address can be assigned by entering the following command:

server_ifconfig movername -c -D -n device -p IP address subnet mask broadcast address where:
movername=data mover node name.
device=user-defined device name of trunked Ethernet port
(trk0).
-C creates an interface object
-D specifies the device that is associated with the interface FIG. 4 is a block diagram illustrating NICdevice structures 400-0, . . . ,400-5 and 402-0 allocated in memory 108 after configuring one of the trunks 124-0 shown in FIG. 1. NICdevice structures 400-0, . . . ,400-5 are allocated for respective network device ports 136-0, . . . ,136-5 and NICdevice structure 402-0 is allocated for trunk 124-0. Trunk 124-0 includes network device ports 136-1, 136-2, 136-4 and 136-5. NICdevice structure 400-0 is allocated to network device port 136-0 which is not a member of trunk 124-0. Thus, owner 404 is set to '0'. NICdevice structure 400-1 is allocated for network device port 136-1. Network device port 136-1 is a member of trunk 124-0. Thus, owner 405 stores a pointer to NICdevice structure 402-0 allocated for trunk 124-0. NICdevice structures 400-2, 400-4 are allocated for network device ports 136-2, 136-4 which are members of trunk 124-0. Thus, owner 406, 408 stores a pointer to NICdevice structure 402-0. NICdevice structure 400-3 is allocated for network device port 136-3, which is not a member of trunk 124-0. Thus, owner 407 stores '0'.

Trunk 124-0 is not a member of a failsafe network device. Thus, owner 410 stores '0'. All data link processing for network device ports that are members of trunk 124-0 is performed using NICdevice structure 402-0. Data link layer processing for all network device ports 136-0, . . . ,136-9 is performed by the data link routines 140. The owner routine 208 selects the NICdevice structure 402-0 for the trunk 124-0 for processing all data packets received by any of the network device ports 136-1, 136-2, 136-4, 136-5 in trunk 124-0. Each network port 136-0, . . . ,136-5 shares the same MAC address and Internet Protocol ("IP") address with all members of the trunk 124-0. A data packet for the MAC address assigned to trunk 124-0 can be received by any one of the physical links 136-0, . . . ,136-9 in the trunk 124-0. The received data packet is forwarded to the respective NICdevice driver 142 dependent on the type of NIC 134-0, . . . , 134-4 through which the data packet was received.

The owner routine 208 (FIG. 2) is then called to find the NICdevice structure allocated to the owner of the MAC address. The owner routine 208 determines if the network device port 136-0, . . . ,136-5 is a member of a trunk 124-0 by checking the state of owner 202 in the respective NICdevice structure 400-0, . . . ,400-5. If owner 202 in the respective NICdevice structure 200-0, . . . ,200-9 stores a pointer to another NICdevice structure 200-0, . . . ,200-9, a trunk 124-0 has been configured and a NICdevice structure allocated. If the owner bit in the pointer to NICdevice structure 200-0, . . . ,200-9 is '0', data link processing is performed using the pointed to NICdevice structure 200-0, . . . ,200-9. If not, the owner routine 208 is called again. The owner of the trunk 124-0 has a NICdevice structure 200-0, . . . ,200-9 with owner 202 set to '0'. Data link processing is performed for all data packets received through any of the physical network ports 136-0, . . . ,136-5 included in the trunk 124-0 using the NICdevice structure allocated to the trunk 124-0.

The locatestream routine 210 (FIG. 2) processes data for packets received over any of the physical links 122-0, . . . ,122-3 in the trunk 124-0. Data link processing for data packets is well-known in the art and beyond the scope of the present invention.

Trunk 124-0 aggregates bandwidth to a particular MAC destination address by increasing the number of physical links 122-0, . . . ,122-3 through which data can be transferred. Data packets for a particular MAC destination address assigned to the trunk 124-0 can be received through a plurality of physical links 122-0, . . . ,122-4 coupled to a plurality of network device ports 136-0, . . . ,136-4 in a plurality of NICs 134-0, . . . , 134-2. Failover support is provided by providing multiple paths to the destination MAC address through a single switch.

Returning to FIG. 1, trunk 124-0 includes physical links 122-0, . . . ,122-3 to switch 104 and trunk 124-1 includes physical links 122-4, . . . ,122-7 to switch 130. Failsafe network device 146 includes trunk 124-0 and trunk 124-1. By providing a path through trunk 124-0 or trunk 124-1, failover support is provided in the event of failure of trunk 124-0 or trunk 124-1.

Figure 5:
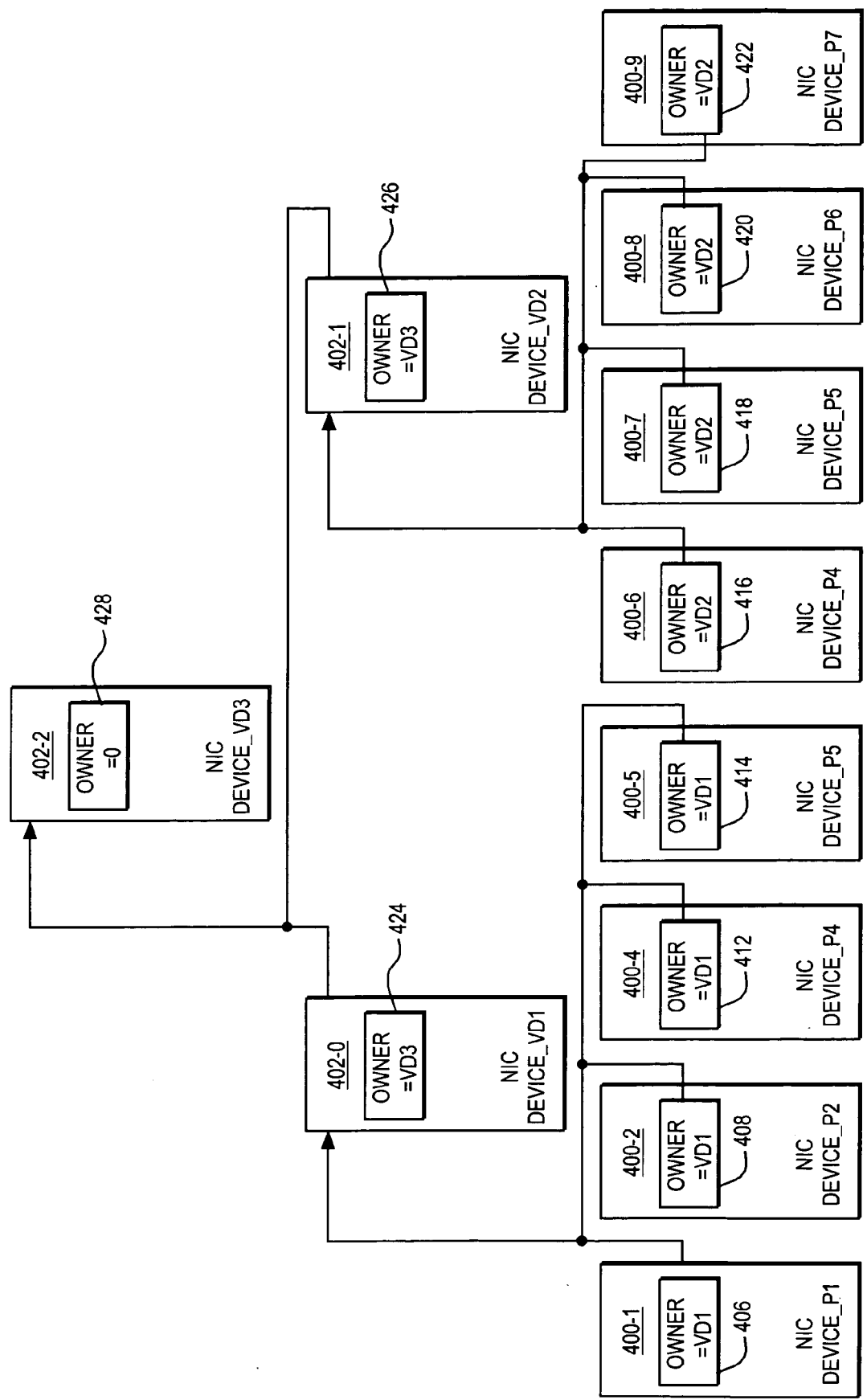
FIG. 5 is a block diagram illustrating device structures allocated in memory in the data mover after configuring a trunk that includes physical links between a plurality of switches.

FIG. 5 is a block diagram illustrating NICdevice structures allocated in memory 108 in the data mover 100 for a failsafe network device 146 including trunks 124-0 and trunk 124-1.

Trunk 124-0 is created by storing a pointer to NICdevice structure 402-0 in owner 406, 408, 412 and 414 in respective NICdevice structures 400-1, 400-2, 400-4 and 400-5. Trunk 124-1 is created by storing a pointer to NICdevice structure 402-1 in owner 416, 418, 420 and 422 in respective NICdevice structures 400-6, 400-7, 400-8 and 400-9.

NICdevice structure 402-2 is created for failsafe network device 146. Failsafe network device 146 is created by storing a pointer to NICdevice structure 402-2 in owner 424 in NICdevice structure 402-0 and owner 426 in NICdevice structure 402-1. Thus a data packet received on any of physical links 122-0, . . . ,122-7 is processed using NICdevice structure 402-2.

Thus, multiple levels of redundancy can be provided by storing the pointer to another NICdevice structure in owner. The data packet is processed using the NICdevice structure with owner set to '0'. Thus, the implementation of a trunk or a failsafe network device does not require any changes to the underlying vendor device drivers or data link protocol routines.

Figure 6:
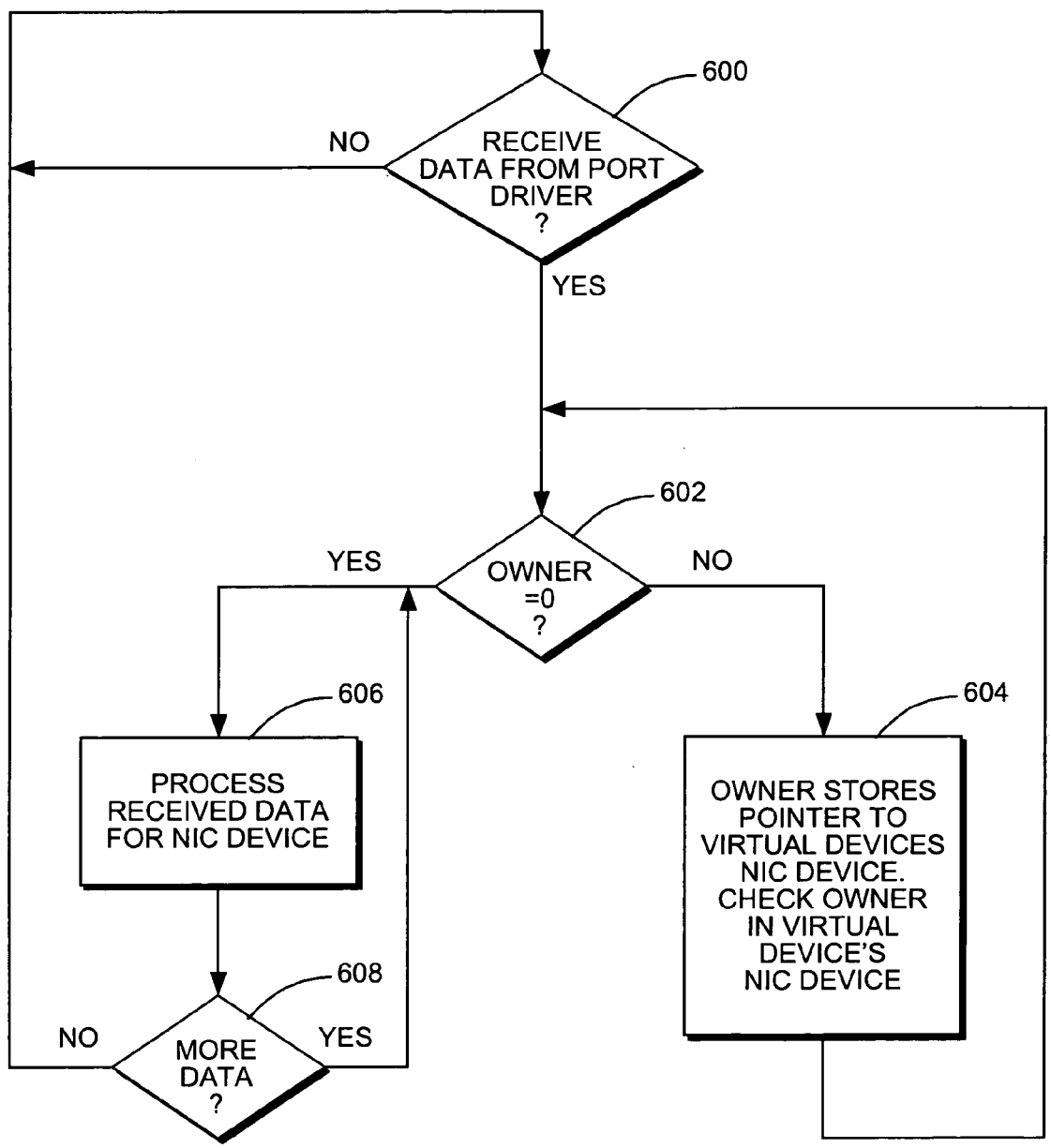
FIG. 6 is a flowchart illustrating a method for receiving a data packet from any of the physical links in any of the trunks shown in FIG. 1.

FIG. 6 is a flowchart illustrating the method for receiving a data packet from any of the physical links in any of the trunks shown in FIG. 1. FIG. 6 is now described here in conjunction with FIGS. 2, 4 and 5.

At step 600, the NICdevice driver 142 checks for a data packet received on any of the physical links. If so, processing continues with step 602. If not, processing continues with step 600 to wait for a received data packet.

At step 602, the owner routine 208 examines the state of owner 202 in the NICdevice structure 200-0, . . . ,200-9 allocated to the network port device coupled to the physical link 126-0, . . . ,126-1 on which the data packet was received. If owner 200 is '0', the physical link 126-0, . . . ,126-9 on which the data packet was received is not a member of trunk 124-0, 124-1 and processing continues with step 606. If the owner 202 stores a pointer to a another NICdevice structure 200, the physical link 126-0, . . . ,126-9 on which the data packet was received is a member of trunk 124-0, 124-1 and processing continues with step 604.

At step 604, the physical link 126-0, . . . 126-9 on which the data packet was received is a member of trunk 124-0, 124-1 or failsafe network device 146. Processing of the data link header is not performed using the NICdevice structure allocated to the network port device 136-0, . . . ,136-9 through which the data packet was received. Instead, the NICdevice structure allocated for trunk 124-0, 124-1 or the failsafe network device 146 is forwarded to the locatestream routine for processing the received data packet. Processing continues with step 602 to examine the forwarded NICdevice structure.

At step 606, the network device port is not a member of a trunk. The locatestream routine in the network port driver is called with the pointer to the NICdevice structure allocated to the network device port to process received data packet.

At step 608, the NICdevice driver 142 checks if there is more data to process. If so, processing continues with step 606. If not, processing continues with step 600 to wait for the next received data packet.

It will be apparent to those of ordinary skill in the art that methods involved in the present invention may be embodied in a computer program product that includes a computer usable medium. For example, such a computer usable medium may consist of a read only memory device, such as a CD ROM disk or conventional ROM devices, or a random access memory, such as a hard drive device or a computer diskette, having a computer readable program code stored thereon.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method implemented in a network file server contained in a data network for providing a trunk, comprising the steps of:
    providing a trunk having a plurality of communications ports;
    coupling the plurality of communications ports to a switch;
    assigning ownership of the plurality of communications ports to a first virtual device;
    setting a network address associated with the first virtual device to a first network address, the first network address assigned to a first communications port;
    setting network addresses for the remaining plurality of communications ports to the first network address;
    upon receiving a data packet from the data network by any of the communications ports in the trunk, forwarding the data packet to the first virtual device; and
    allocating a plurality of device structures, a device structure allocated for each of the plurality of communications ports, each device structure including an owner field.

2. The method as claimed in claim 1 further comprising the steps of:
    receiving a data packet destined for the data network at the first virtual device; and
    transmitting the data packet through one of the plurality of communications ports in the trunk.

3. The method as claimed in claim 2 further comprising the step of:
    selecting one of the plurality of communications ports for transmitting the data packet dependent on the result of an exclusive OR operation on a portion of a source network address and a destination network address.

4. The method as claimed in claim 3 wherein the portion of the source network address and the destination network address are dependent on a number of communications ports in the trunk.

5. The method as claimed in claim 1 wherein the first network address is a data link layer address, and
    wherein the data link layer address is an Ethernet address.

6. The method as claimed in claim 5 wherein the data link layer address is an IEEE 802.3 address.

7. The method as claimed in claim 6 further comprising the steps of:
    assigning ownership of a second plurality of communications ports coupled to a second switch to a second virtual device;
    assigning ownership of the first virtual device and the second virtual device to a third virtual device;
    setting a failsafe network device address associated with a failsafe network device to the first network address;
    setting the first network address and a network address associated with the second virtual device to the failsafe network device address; and
    upon receiving a data packet from the data network for the failsafe network device address by a communications port in the plurality of communications ports in the trunk, forwarding the data packet to the failsafe network device.

8. A method implemented in a network file server contained in a data network comprising the steps of:
    providing a trunk having a plurality of communications ports;
    coupling the plurality of communications ports to a switch;
    assigning ownership of the plurality of communications ports coupled to a first virtual device;
    setting a network address associated with the first virtual device to a first network address, the first network address assigned to a first communications port;
    setting network addresses for the remaining plurality of communications ports to the first network address;
    upon receiving a data packet from the data network by a communications port in the plurality of communications ports in the trunk, forwarding the data packet to the first virtual device; and
    allocating a plurality of device structures, a device structure allocated for each of the plurality of communications ports, each device structure including an owner field,
    wherein the step of assigning ownership further comprises the step of:
        storing a pointer to a virtual device structure allocated for the first virtual device in the owner field in each of the plurality of device structures, and
    wherein the step of forwarding further comprises the steps of:
        examining the contents of the owner field in the device structure allocated to the communications port that is receiving the data packet; and
        selecting the first virtual device pointed to by the pointer stored in the owner field.

9. A network file server contained in a data network comprising:
- a plurality of communications ports coupled to a switch;
- a trunk configuration routine which creates a virtual device for the plurality of communications ports, sets a network address associated with the virtual device to a first network address assigned to a first communications port and sets network addresses for the remaining communications ports in the plurality of communications ports to the first network address;
- an owner routine, which selects the virtual device associated with the network address for a data packet received by any of the communications ports in the trunk; and
- a device driver which allocates a device structure for each of the plurality of communications ports, each device structure including an owner field.

10. A network file server contained in a data network comprising:
- a plurality of communications ports coupled to a switch;
- a trunk configuration routine which creates a virtual device for the plurality of communications ports, sets a network address associated with the first virtual device to a first network address assigned to a first communications port, sets network addresses for the remaining communications ports in the plurality of communications ports to the first network address, and allocating a device structure for each of the plurality of communications ports; and
- an owner routine which selects the virtual device associated with the network address associated with the first virtual device for a data packet received by any of the plurality of communications ports in the trunk,
- wherein the trunk configuration routine allocates a device structure for the first virtual device and stores a pointer to the device structure allocated for the first virtual device in an owner field in the device structure for each of the plurality of communications ports, and
- wherein the owner routine examines the contents of the owner field in the device structure for each of the plurality of communications ports receiving a data packet and selects the first virtual device pointed to by the pointer stored in the owner field.

11. The network file server as claimed in claim 10 further comprising:
- a virtual device driver which selects one of the plurality of communications ports through which to transmit a data packet on the trunk.

12. The network file server as claimed in claim 11 wherein the virtual device driver selects one of the plurality of communications ports dependent on the result of an exclusive OR operation on a portion of a source network address and a destination network address.

13. The network file server as claimed in claim 12 wherein the portion of the source network address and the destination network address are dependent on a number of communications ports in the trunk.

14. The network file server as claimed in claim 10 wherein the first network address is a data link layer address.

15. The network file server as claimed in claim 14 wherein the data link layer address is an Ethernet address.

16. The network file server as claimed in claim 15 wherein the data link layer address is an IEEE 802.3 address.

17. The network file server as claimed in claim 16 wherein the trunk configuration routine assigns ownership of a second plurality of communications ports coupled to a second switch to a second virtual device, and assigns ownership of the first virtual device and the second virtual device to a third virtual device.

18. The network file server as claimed in claim 17 wherein the trunk configuration routine further sets a failsafe network device address associated with a failsafe network device to the first network address, and sets a virtual address assigned to the first virtual device to the failsafe network device address.

19. A network file server comprising:
- a plurality of communications ports coupled to a switch;
- means for providing a trunk, the trunk including the plurality of communications ports, by assigning ownership of the plurality of communications ports to a virtual device;
- means for setting a network address associated with the virtual device to a first network address assigned to a first communications port, and for setting network addresses for the remaining plurality of communications ports to the first network address;
- means for forwarding a received data packet from a data network, the received data packet having been received by a communications port in the plurality of communications ports in the trunk, the received data packets being forwarded to the virtual device; and
- means for allocating a plurality of device structures, a device structure allocated for each of the plurality of communications ports, each device structure including an owner field.

20. A network file server contained in a data network comprising:
- a plurality of communications ports coupled to a switch;
- means for providing a trunk including the plurality of communications ports by assigning ownership of the plurality of communications ports to a first virtual device;
- means for setting a network address associated with the first virtual device to a first network address, the first network address assigned to a first communications port;
- means for setting network addresses for the remaining plurality of communications ports to the first network address;
- means for forwarding a data packet received from the data network by a communications port in the plurality of communications ports in the trunk to the first virtual device; and
- means for allocating a plurality of device structures, a device structure allocated for each of the plurality of communications ports, each device structure including an owner field,
- wherein the trunk configuration routine further comprises:
  - means for storing a pointer to the plurality of device structures, and
- wherein the means for forwarding further comprises:
  - means for examining the contents of the owner field in the device structure allocated to a communications port in the plurality of communications ports receiving a data packet; and
  - means for selecting the first virtual device pointed to by the pointer stored in the owner field.

21. The network file server as claimed in claim 20 further comprising:
- means for receiving a data packet destined for the data network at the first virtual device; and
- means for transmitting the data packet through one of the plurality of communications ports in the trunk.

22. The network file server as claimed in claim 21 wherein the means for transmitting selects one of the plurality of communications ports dependent on the result of an exclusive OR operation on a portion of a source network address and a destination network address.

23. The network file server as claimed in claim 22 wherein the portion of the source network address and the destination network address are dependent on a number of communications ports in the trunk.

24. The network file server as claimed in claim 20 wherein the first network address is a data link layer address.

25. The network file server as claimed in claim 24 wherein the data link layer address is an Ethernet address.

26. The network file server as claimed in claim 24 wherein the data link layer address is an IEEE 802.3 address.

27. The network file server as claimed in claim 20 further comprising:
a second plurality of communications ports coupled to a second switch wherein the means for providing provides a second trunk including a second plurality of communications ports by assigning ownership of the second plurality of communications ports to a second virtual device; and means for assigning ownership of the first virtual device and the second virtual network device to a third virtual network device.

28. The network file server as claimed in claim 27 wherein the means for setting a trunk network address further sets a failsafe network device address to the trunk network address, and sets a virtual network address assigned to the virtual network device to the failsafe network device address.

* * * * *